Patented Dec. 1, 1925.

1,563,410

UNITED STATES PATENT OFFICE.

JOHN MORRIS WEISS, OF NEW YORK, N. Y.

INCORPORATION OF RUBBER IN NONAQUEOUS MATERIALS.

No Drawing. Application filed December 18, 1923. Serial No. 681,409.

*To all whom it may concern:*

Be it known that I, JOHN MORRIS WEISS, a citizen of the United States, and residing at 510 West 110 Street, in the city and county of New York, and State of New York, have invented certain new and useful Improvements in the Incorporation of Rubber in Nonaqueous Materials, of which the following is a specification.

This invention relates to a method of introducing rubber into high boiling oils or solids readily liquefiable by heat. One object is to incorporate the rubber thoroughly in a short space of time and impart to the product some of the elastic properties of the rubber itself. If an oil or liquefiable solid is ground or macerated with ordinary crude rubber, a solution or suspension may be obtained but a time of mixing of eight or more hours is required to obtain a homogeneous mixture. Moreover, in many cases it is necessary to mix at temperatures of 140° C. or higher in order to obtain the mixture within a reasonable time and such temperatures tend to destroy the elastic properties of rubber if continued over extended periods.

In practicing my invention the oil or liquefiable solid is brought to a temperature of above 100° C., for most purposes a temperature of from 110° C. to 120° C. being preferred. For some materials such as those which are not liquid at 120° C. higher temperatures may be used and as the process is one of short duration these higher temperatures are not as injurious as they would be if long continued. To the liquefiable material is added rubber latex which is an emulsion of rubber particles in water and which is drawn directly from the rubber trees. This comes into commerce with various preservatives and stabilizers, usually aqua ammonia, added. The latex is run into the hot agitated liquid material at a sufficiently low speed to avoid undue foaming. The water and ammonia, etc. are volatilized, which liberates the rubber in situ, whereby it thoroughly mixes with and incorporates in the liquid as it is liberated. After the required amount of latex is added, the heating and stirring are continued for a short time to expel the residual water and ammonia vapor and the batch is then finished. In order to specifically point out the invention I cite the following example which is for illustrative purposes only and the basic wax and the proportions and temperatures may be materially changed without departing from the spirit and scope of my invention.

Weigh 67 lbs. of paraffin wax into a pressure steam-heated kettle provided with a powerful stirrer. Heat the wax until melted and continue the heating to a wax temperature of 115° to 120° C. Start the stirrer and add one gallon of a latex containing 35 to 40% by weight of rubber. The addition of the latex should take about one hour total and the speed of addition regulated to avoid excessive foaming. The steam on the kettle jacket or coil should be adjusted to make up for the heat loss in volatilizing the water and ammonia in the latex, so as to keep the temperature of the mix around 115 to 120° C. After all the latex is added, continue the stirring for 15 to 30 minutes after which the product is finished and can be used in the liquid state or can be allowed to solidify in cakes. This particular mix is useful in making moulded wax articles, the rubber serving to give additional mechanical strength and at the same time rendering the product less brittle. The product can be remelted with fresh wax in case it is desired to reduce the percentage of rubber and mixes readily distributing the rubber through the entire mass. If desired, other waxes, colors, sulphur or other vulcanizers, vulcanization accelerators, fillers, etc. may be added to alter the properties in any desired fashion.

This method can be used as a means of incorporating rubber into any non-aqueous liquid boiling above 110° C. but is more particularly useful in introducing rubber into materials solid at ordinary temperatures but which are liquefied by heat at temperatures below 150° C. Pitches, waxes, gums, resins, fats, all these if not too high in melting point, and vegetable or mineral oils are susceptible to this treatment. The proportions of rubber and other added ingredients may vary widely.

Having thus described my invention, I claim—

1. The method of incorporating rubber in non-aqueous liquids having boiling points of at least 110° C. which comprises the addition of a colloidal aqueous solution of rubber to the non-aqueous liquid at a temperature from 110° C. to 150° C.

2. The method of incorporating rubber in non-aqueous liquids having boiling points of at least 110° C. which comprises the addition of a colloidal aqueous solution of rubber to the non-aqueous liquid at a temperature from 110° C. to 150° C. and continuing the heating until the water has been expelled from the mixture.

3. The method of incorporating rubber in non-aqueous liquids having boiling points of at least 110° C. which comprises the addition of a latex to the non-aqueous liquid at a temperature from 110° C. to 150° C.

4. The method of incorporating rubber in non-aqueous liquids having boiling points of at least 110° C. which comprises the addition of a latex to the non-aqueous liquid at a temperature from 110° C. to 150° C. and heating and stirring until the water has been expelled from the mixture.

5. The method of incorporating rubber in wax which comprises the addition of a latex to the wax at a temperature from 110° C. to 150° C.

6. The method of incorporating rubber in wax which comprises the addition of a latex to the wax at a temperature from 110° C. to 150° C. and heating and stirring until the water has been expelled from the mixture.

7. The method of incorporating rubber in paraffin wax which comprises the addition of a latex to the paraffin wax at a temperature from 110° C. to 150° C.

8. The method of incorporating rubber in paraffin wax which comprises the addition of a latex to the paraffin wax at a temperature from 110° C. to 150° C. and heating and stirring until the water has been expelled from the mixture.

9. The method of incorporating rubber in paraffin wax which comprises the addition of a colloidal aqueous solution of rubber to the paraffin wax at a temperature from 110° C. to 150° C.

10. The method of incorporating rubber in paraffin wax which comprises the addition of a colloidal aqueous solution of rubber to the paraffin wax at a temperature from 110° C. to 150° C. and continuing the heating until the water has been expelled from the mixture.

11. The method of incorporating rubber in non-aqueous liquids having boiling points of at least 110° C. which comprises the addition of a colloidal aqueous solution of rubber to the non-aqueous liquid at a temperature of substantially 120° C.

12. The method of incorporating rubber in non-aqueous liquids having boiling points of at least 110° C. which comprises the addition of a latex to the non-aqueous liquid at a temperature of substantially 120° C.

13. The method of incorporating rubber in paraffin wax which comprises the addition of a latex to the paraffin wax at a temperature of substantially 120° C. and heating and stirring until the water has been expelled from the mixture.

14. The method of incorporating rubber in paraffin wax which comprises the addition of a collodial aqueous solution of rubber to the paraffin wax at a temperature of substantially 120° C.

In testimony whereof, I hereby affix my signature.

JOHN MORRIS WEISS.